United States Patent
Camenisch et al.

(10) Patent No.: US 10,911,242 B2
(45) Date of Patent: Feb. 2, 2021

(54) AUTHENTICATION IN DISTRIBUTION SYSTEMS

(71) Applicant: International Business Machines Corporation, Armonk, NY (US)

(72) Inventors: Jan L. Camenisch, Thalwil (CH); Emmanuel Delamarche, Thalwil (CH); Eduarda Freire Stögbuchner, Unterhaching (DE); Onur Gökçe, Zurich (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 232 days.

(21) Appl. No.: 15/991,574

(22) Filed: May 29, 2018

(65) Prior Publication Data
US 2019/0372775 A1   Dec. 5, 2019

(51) Int. Cl.
*H04L 9/32*  (2006.01)
*H04L 29/06*  (2006.01)
(Continued)

(52) U.S. Cl.
CPC .......... *H04L 9/3247* (2013.01); *G06Q 10/08* (2013.01); *H04L 9/006* (2013.01); *H04L 63/12* (2013.01); *H04L 2209/805* (2013.01)

(58) Field of Classification Search
CPC ... H04L 2209/805; H04L 63/12; H04L 9/006; H04L 9/3247; H04L 63/126; H04L 9/3263
See application file for complete search history.

(56) References Cited

U.S. PATENT DOCUMENTS 8,052,058 B2 * 11/2011 He ............... G06Q 10/06
235/462.09
8,185,744 B2 * 5/2012 Brown .............. H04L 9/3252
713/180

(Continued)

FOREIGN PATENT DOCUMENTS

WO     2017027648 A1    2/2017

OTHER PUBLICATIONS

Keni, Harshith R., "Product Authentication Using Hash Chains and Printed QR Codes," Diss. South Dakota State University, 2016, 58 pages.
(Continued)

*Primary Examiner* — Gary S Gracia
(74) *Attorney, Agent, or Firm* — Cantor Colburn LLP; Daniel Morris

(57) ABSTRACT

Methods are provided for authenticating a container of items to be sent by a sender to a receiver. The method includes: packing a plurality of items, each having a respective item identifier, in the container; providing a container identifier on the container; and generating a first digital signature by signing a message, comprising the container identifier and each item identifier, using a secret signing key $sk_S$ of a signing-verification key pair ($sk_S$, $pk_S$) of a digital signature scheme. The method further comprises providing the first digital signature for access by the receiver, and sending the container to the receiver. A corresponding verification method comprises accessing the first digital signature, and verifying the first digital signature for the container identifier and the item identifier for each item in the container using the verification key $pk_S$ of the sender key pair ($sk_S$, $pk_S$).

19 Claims, 5 Drawing Sheets

(51) Int. Cl.
*H04L 9/00* (2006.01)
*G06Q 10/08* (2012.01)

(56) References Cited

U.S. PATENT DOCUMENTS

| | | | | |
|---|---|---|---|---|
| 8,534,544 | B1* | 9/2013 | Eker | G06K 19/10 235/375 |
| 8,660,914 | B2* | 2/2014 | Soppera | G06Q 30/0185 705/28 |
| 9,053,364 | B2* | 6/2015 | Mercolino | G06K 7/10 |
| 9,070,131 | B2* | 6/2015 | Feldman | G08B 7/06 |
| 9,306,750 | B2* | 4/2016 | Syngkon | H04L 63/0428 |
| 10,640,273 | B2* | 5/2020 | Camenisch | G06K 19/06037 |
| 2007/0234058 | A1* | 10/2007 | White | H04L 9/3247 713/176 |
| 2009/0222285 | A1* | 9/2009 | Silverbrook | G06Q 10/087 705/2 |
| 2011/0303564 | A1* | 12/2011 | Pearson | B65C 3/06 206/232 |
| 2011/0303746 | A1* | 12/2011 | Learmonth | B65D 79/02 235/380 |
| 2013/0159712 | A1* | 6/2013 | Sigworth | G16H 70/40 713/168 |
| 2017/0032382 | A1* | 2/2017 | Shulman | G06Q 30/0185 |
| 2017/0350821 | A1* | 12/2017 | Delamarche | G01N 21/8483 |

OTHER PUBLICATIONS

Ahlund, "RFID in the BioPharmaceutical Supply Chain," BioPharm International, vol. 18, Issue 4, 2005, 3 pages.
Camenisch et al., "Authentication of Packaged Products," U.S. Appl. No. 15/991,552, filed May 29, 2018.
EPCglobal, "Pedigree Ratified Standard," Version 1.0, Jan. 2007, https://www.gs1.org/sites/default/files/docs/epc/pedigree_1_0-standard-20070105.pdf (retrieved May 3, 2018), 138 pages.
List of IBM Patents or Patent Applications Treated As Related; Date Filed: May 29, 2018, 2 pages.
marketsandmarkets.com, "Anti-Counterfeit Packaging Market by Technology (Coding & Printing, RFID, Hologram, Security labels, Packaging Design), Usage Feature (Track & Trace, Tamper Evidence, Overt, Covert, Forensic Markers), End-use Sector, and Region—Global Forecast to 2021," https://www.marketsandmarkets.com/Market-Reports/anti-counterfeit-packaging-advanced-technologies-and-global-market-129.html (retrieved May 2, 2018), 4 pages.
Morphotonix, "Morphotonix Product-embedded security," http://www.morphotonix.com/ (retrieved May 2, 2018), 2 pages.
Pearson, "Securing the Pharmaceutical Supply Chain with RFID and Public-key infrastructure (PKI) Technologies," Texas Instruments White Paper, 2005, 12 pages.
Qin et al., "No Room for Error: RFID-enabled Smart Point-of-Care Medication Process in Hospital Wards," 2011 IEEE International Conference on RFID-Technologies and Applications (RFID-TA), IEEE, 2011, pp. 353-358.
Wallstabe et al., "Implementing high-level Counterfeit Security using RFID and PKI," 2007 3rd European Workshop on RFID Systems and Technologies (RFID SysTech), VDE, 2007, 20 pages.

* cited by examiner

AUTHENTICATION IN DISTRIBUTION SYSTEMS

BACKGROUND

The present invention relates generally to authentication in distribution systems, and more particularly to authentication of containers of items sent between senders and receivers in supply chains.

Theft and introduction of fraudulent products are common in product distribution systems. Fake, stolen or compromised products can be injected at various points in a supply chain. A typical genuine logistical supply chain includes a manufacture, countrywide distributors, local distributors, and endpoints of sale. Fraudulent products can enter the supply chain at any of these points. A particularly pertinent example is the pharmaceutical supply chain where injection of fraudulent products is of increasing concern to the World Health Organization. Medical products are commonly stored in remote locations with weak surveillance, and are often not securely transported from one point of sale to another. This allows easy theft of pharmaceuticals which later re-enter the market. Since proper storage and transportation of stolen goods is not guaranteed, efficacy of products can be compromised. Expired, withdrawn or otherwise falsified products can also be introduced in supply chains. These problems pose a significant threat to public health.

In general, increasing profit margins continue to motivate fraud and counterfeiting, particularly for products that are easy to fabricate and/or widely used. In most cases, trafficking of fraudulent products is facilitated by distributors who receive goods without knowing their origin. It is therefore important to provide mechanisms for authenticating goods at every step in a supply chain.

Systems currently exist for tracking items in a supply chain at the item level. A known system uses RFID (radio-frequency identification) tags applied to items, e.g. manufactured products, which are programmed with unique identifiers (UIDs). The tags can be PKI (Public Key Infrastructure)-enabled to permit authentication via digital signatures. The tag manufacturer generates a digital signature by signing the UID using a secret signing key sk of a signing-verification key pair (sk, pk) of a digital signature scheme. An RFID reader can be used to verify authenticity of the signature using the (public) verification key pk. Entities handling tagged items in a supply chain may store transaction data, such as dates, timestamps etc., in the tag and also in network storage. The transaction data may be digitally signed by each entity, and can be integrated into an electronic pedigree (e-pedigree) system in which each entity in a supply chain adds transaction information to the existing pedigree and digitally signs the result. In this way, individual items can be tracked through successive distribution steps, with each entity in the supply chain verifying and supplementing the item pedigrees.

Improvements in authentication systems for use in supply chains would be highly desirable.

SUMMARY

According to at least one embodiment of the present invention there is provided a method for authenticating a container of items to be sent by a sender to a receiver. The method includes: packing a plurality of items, each having a respective item identifier, in the container; providing a container identifier on the container; and generating a first digital signature by signing a message, comprising the container identifier and each item identifier, using a secret signing key $sk_S$ of a signing-verification key pair $(sk_S, pk_S)$ of a digital signature scheme. The method further comprises providing the first digital signature for access by the receiver, and sending the container to the receiver.

Methods embodying the invention cryptographically bind all items in a container to that container via the digital signature on the item and container identifiers. The receiver can authenticate all items in the container simply by verifying the signature for that container using the (public) verification key $pk_S$ of the sender. Item-level authentication is thus provided via a digital signature for the packed container as a whole. This method can be performed by each sender along a supply chain for successive authentication by receivers in the chain.

The message signed by the sender can include a sender identifier and a receiver identifier for confirmation of the sender and receiver in the signature. In addition, embodiments of the invention provide the message for access by the receiver along with the first digital signature. This allows a receiver to authenticate provenance of individual items, which may have been repacked in different containers at various points in a supply chain, via an elegant technique described below. For convenience, in embodiments of the invention the message is stored with the first digital signature in network storage for access by the receiver via a network.

As well as generating the first digital signature, methods according to embodiments of the invention include generating a second digital signature by signing (at least) the container identifier, a sender identifier for the sender and a receiver identifier for the receiver using the secret signing key $sk_S$. The second digital signature is provided on the container. This allows convenient confirmation of the correct sender and receiver for a received container. Ideally, the sender identifier in this signature comprises the verification key $pk_S$ of the sender's key pair $(sk_S, pk_S)$, and the receiver identifier comprises a verification key $pk_R$ of a signing-verification key pair $(sk_R, pk_R)$ where $sk_R$ is a secret signing key of the receiver. This permits verification of the identity of the intended receiver and also of the true identity of the sender by verifying validity of the verification key $pk_S$ via a PKI as discussed below.

The container may be sent directly to the receiver, or indirectly via one or more intermediate entities who forward the container, without repacking items, to a next entity in the supply chain. In the latter case, a second digital signature may be produced using a different signing key at the sender. In particular, the second digital signature may be produced by signing the container identifier, a sender identifier for the sender and an entity identifier for the next intermediate entity in the supply chain using a secret signing key $sk_1$ of a signing-verification key pair $(sk_1, pk_1)$. The sender identifier here comprises the verification key $pk_1$ of the key pair $(sk_1, pk_1)$, and the entity identifier comprises a verification key $pk_1$ of a signing-verification key pair $(sk_1, pk_1)$, where $sk_1$ is a secret signing key of the intermediate entity. This permits convenient yet secure authentication of items at the container level during forwarding to the receiver via a process detailed below.

The container identifier (and optionally any signature(s) provided on the container) can be conveniently provided in print on the container. The use of RFID tags or similar memory devices is not required for security of the system.

At least one further embodiment of the invention provides a verification method for verifying authenticity of items in a container of items authenticated by a method as described above and received from the sender by the receiver. The verification method comprises accessing the first digital signature, and verifying the first digital signature for the container identifier and the item identifier for each item in the container using the verification key $pk_S$ of the sender key pair ($sk_S$, $pk_S$).

Particularly advantageous verification methods can accommodate aggregation/disaggregation of items due to unpacking and repacking at different points along a supply chain, while still enabling the receiver to authenticate the supply chain for each individual item. Such a verification method can be applied where the received container is authenticated by an authentication method described above in which the message includes a sender identifier and a receiver identifier, the message is stored with the first digital signature in network storage for access by the receiver, and the sender is the last sender in a supply chain for each item comprising senders who authenticate their containers of items by that authentication method. The verification method includes, for each item: (a) determining if the sender, having a sender identifier S, is an original sender in the supply chain for that item, and if not (b) finding in the network storage a further first digital signature produced, by a previous sender in the supply chain for the item, on a message containing the item identifier for that item and a receiver identifier corresponding to the sender identifier S; (c) verifying the further first digital signature for the message stored therewith; and (d) repeating steps (a) to (c) for each previous sender in the supply chain until the previous sender is determined to be the original sender in step (a).

The foregoing method allows each receiver in a supply chain to use the container-level signatures to authenticate the supply chain for any individual item back to the original sender of that item, even if items are repacked in new containers at various stages in the distribution process. This provides a highly efficient system for authenticating supply chains for individual items.

Verification methods embodying the invention may include additional steps corresponding to particular steps of authentication methods described above.

At least one further embodiment of the invention provides a computer program product for causing a receiver computer to perform a verification method described above.

Embodiments of the invention will be described in more detail below, by way of illustrative and non-limiting example, with reference to the accompanying drawings.

DETAILED DESCRIPTION

Figure 1:
FIG. 1 shows entities in a supply chain.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments to be described make use of PKIs and digital signature schemes, the basic principles of which are explained below.

Digital Signatures

A digital signature scheme is a triple of polynomial-time algorithms DSIG=(gen, sig, ver) together with a message space $\mathcal{M}$ where:
gen($\lambda$): takes as input a security parameter $\lambda$, and outputs a key pair (pk, sk).
sig(sk, m): takes as input a signing key sk and a message m$\in \mathcal{M}$, and outputs a signature $\sigma$.
ver(pk, m', $\sigma$): takes as input a verification key pk, a message m' and a purported signature $\sigma$, and outputs valid or invalid.

Correctness. A digital signature scheme is said to be correct if for all $$(\text{pk, sk}) \xleftarrow{r} \text{gen}(\lambda),$$

and all messages m$\in \mathcal{M}$, it holds that valid$\leftarrow$ver(pk, m, sig(sk, m)).

The standard security notion for signature schemes is called existential unforgeability under an adaptive chosen message attack. In this notion, an adversary, after seeing the verification key, can adaptively obtain a polynomial number of signatures on messages of its choice, and is not able to generate a valid signature on a new message.

Public Key Infrastructure (PKI)

A PKI is a system that binds public keys (such as verification keys of a digital signature scheme) to users. The binding is established through registration of the public key and issuance of a certificate by a Certificate Authority (CA). The certificates are stored by the CA, and can be revoked if needed. Each certificate includes the name of the user, along with its corresponding public key, and a digital signature created by the CA. Digital certificates are verified using a chain of trust. This is an ordered list of certificates containing the end-user certificate which needs to be verified in order to validate the public key of the end-user, intermediate certificates, and a root certificate, which is the trust anchor. The root certificate is an unsigned or self-signed certificate that identifies the public key of the root CA. It is made known to all users of the PKI via a secure distribution, such as secure physical distribution. The private key (signing key) of the root CA is used to sign public keys of subordinate CAs. The latter use their own private keys to sign public keys of CAs lower down in the hierarchy, until the end-user public key is signed.

FIG. 1 illustrates basic entities in an exemplary supply chain. The supply chain comprises a manufacturer, a set of (in general one or more) distributors, and a final end point, here a retailer. The manufacturer and each distributor can pack containers with items and send the containers to the next entity along the chain. The supply chain authentication process uses a signature scheme DSIG=(gen, sig, ver) as described above. All entities who send containers (hereinafter "senders") have respective signing-verification key pairs of the signature scheme comprising a signing key, which is secret to each entity, and a corresponding (public) verification key.

Figure 2:
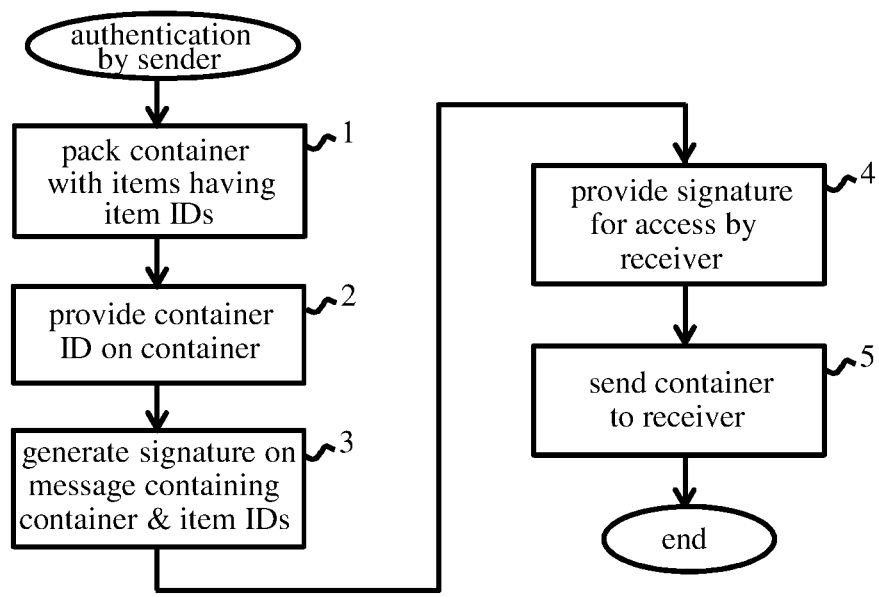
FIG. 2 indicates steps of an authentication method performed by senders in the supply chain.

Each sender performs a method for authenticating a container of items to be sent to the next entity (hereinafter the "receiver") in the supply chain. Basic steps of the authentication method are indicated in FIG. 2. In step 1, the sender packs a plurality of items, each having a respective item identifier (ID), in the container. In step 2, the sender provides a container identifier on the container. In step 3, the sender generates a digital signature by signing a message, comprising (at least) the container identifier and each item identifier of items in the container, using the secret signing key $sk_S$ of the sender's signing-verification key pair ($sk_S$, $pk_S$). The sender provides the resulting signature for access by the receiver in step 4, and sends the container to the receiver in step 5.

The basic steps of the above process may be performed in any convenient order. An item may comprise any unitary item such as a single product or a package containing more than one product. The term "container" is used herein in the most general sense and may comprise a box, case, wrapper, package, crate, shipping container or any other holder for a plurality of items to be distributed along a supply chain.

Item identifiers can be applied to items at the manufacturer, and are conveniently provided in print on the items, e.g. printed directly on a product/product-packaging or by means of a printed label such as a tamper-proof sticker or other label securely fixed to the item. The container identifier is conveniently also provided in print on the container, e.g. via a tamper-proof label. In embodiments of the invention below, the item identifiers are ideally unique in the distribution system so that concurrence of two items with the same identifier is prohibited or at least highly improbable. The container identifier can also be unique, at least to that sender as discussed below.

The signature generation step can be performed by a computer at the sender, e.g. a special-purpose computer such as a dedicated HHU (hand-held unit), or a general-purpose computer providing functionality for implementing the signature generation algorithm.

In some embodiments, the signature may be provided on the container (step 4 of FIG. 1) for access by the receiver. In general, the signature may be made accessible to the receiver via any convenient channel. The message signed in step 3 can also be provided with the signature for access by the receiver. In embodiments of the invention below, step 4 of FIG. 1 includes storing the message with the first digital signature in network storage for access by the receiver via a network.

The item/container ID provided on an item/container (and the signature if provided on the container) can be represented in various ways, and the manner of representation may differ for item IDs and container IDs/signatures. For example, data can be presented by one or a combination of text, numerals, symbols, ink-printed dots (which may be multi-colored), optical devices such as holograms, code patterns such as barcodes, QR (Quick Response) codes, or any other code formation or data representation mechanism. Memory devices such as RFID (radio frequency identification) tags could also be used, but this is undesirable due to the added cost and complexity associated with these devices. Embodiments of the authentication system can ensure security of the supply chain without use of such secure memory tags.

Figure 3:
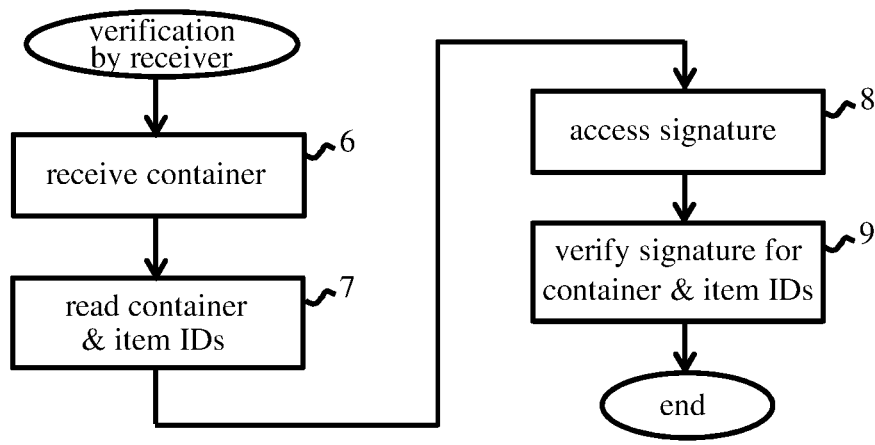
FIG. 3 indicates steps of a verification method performed by receivers in the supply chain.

On receipt of the container, the receiver performs a verification method basic steps of which are shown in FIG. 3. The container is received and opened in step 6. In step 7, the container ID is read from the container and the item ID is read from each item in the container. In step 8, the receiver accesses the signature for the container, e.g. by reading the signature from the container or accessing the signature in network storage. In step 9, the receiver verifies the signature for the container identifier and the item identifier for each item in the container using the verification key $pk_S$ of the sender's key pair ($sk_S$, $pk_S$). Only if the signature is valid will the receiver accept the items as authentic.

Where the message is provided with the signature accessed in step 8, step 9 involves checking the container and item IDs read in step 7 against the IDs in the message, and then verifying the signature for the message. However, embodiments can be envisaged where the message format is known to the receiver such that a message m' for input to the verification algorithm ver(pk, m', σ) can be reconstructed from the IDs read in step 7. In this case, the signed message m need not be provided to the receiver.

Steps of the verification process can be performed by a general- or special-purpose computer providing functionality for implementing steps of FIG. 3. The step of reading the container and item IDs is conveniently implemented via a reader device operatively associated with the receiver computer as discussed further below.

Use of the digital signature as described above cryptographically binds the items to the container, permitting item-level authentication for all items in the container simply by verifying the signature for the container as a whole. This process can be performed by all senders in the supply chain for successive authentication by receivers as items pass along the chain.

Embodiments of the authentication system will be described below in the context of pharmaceutical products in a pharmaceutical supply chain. Packages of pharmaceutical products produced at a manufacturer are distributed via one or more distributors to an end point of sale, such as a hospital or pharmacy. All packages carry a unique package identifier pkgID applied at the manufacturer. The package IDs are provided on the packages in machine-readable printed form as described above. Each sender, commencing with the manufacturer, in the supply chain can fill up boxes with packages of its choice. Each distributor can unpack a received box, place some of the packages in a different box along with other packages, and then dispatch the new box to the next receiver.

Each sender in the supply chain has a respective signing-verification key pair as described above. The sender key pair is denoted generally by ($sk_S$, $pk_S$) in the following, but is of course different for each entity. Hence, the manufacturer has a key pair ($sk_M$, $pk_M$), and each distributor D1, D2, etc., has a corresponding key pair ($sk_{D1}$, $pk_{D1}$), ($sk_{D2}$, $pk_{D2}$), etc. When any given entity is a receiver in the operation described below, their aforementioned key pair is denoted generally by ($sk_R$, $pk_R$). Each receiver in the supply chain holds the verification key $pk_M$ of the manufacturer. All public keys are certified via a PKI as described above.

Figure 4:
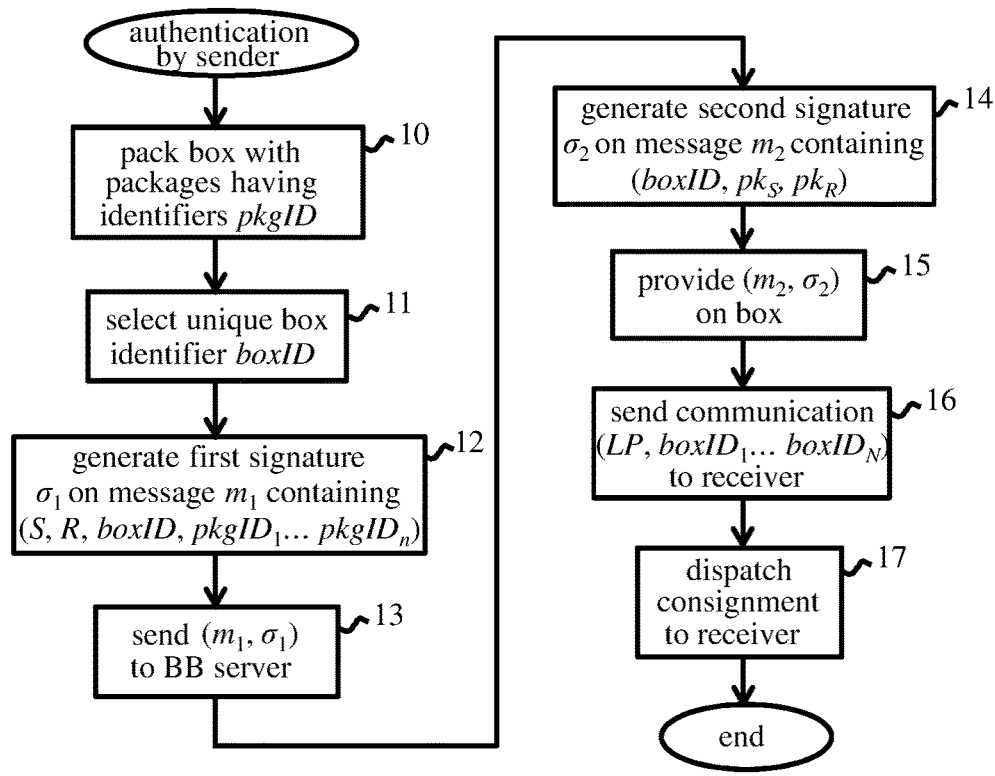
FIG. 4 indicates steps of an authentication method according to embodiments of the invention.

FIG. 4 indicates steps of the authentication method performed by each sender in this embodiment. In step 10, the sender packs a box with a plurality n of packages bearing respective package identifiers pkgID. In step 11, the sender selects a unique box identifier boxID for the box. In step 12, the sender generates a first digital signature $\sigma_1$ by signing a message $m_1$ which includes a sender identifier (here sender name) S, a receiver identifier (here receiver name) R, the box identifier boxID, and the package identifiers $pkgID_1, \ldots, pkgID_n$ of all packages in the box. The signature is computed as $\sigma_1 = sig(sk_S, S\|R\|boxID\|pkgID_1\| \ldots \|pkgID_n)$, where $\|$ denotes concatenation. In step 13, the sender sends the message $m_1$ and signature $\sigma_1$ to a bulletin board (BB) server which stores a record ($m_1$, $\sigma_1$) in network storage for later access by receivers via the bulletin board.

Next, in step 14, the sender generates a second digital signature $\sigma_2$ by signing a message $m_2$ including the container identifier boxID, a sender identifier and a receiver identifier. In this embodiment of the invention, the sender identifier includes the verification key $pk_S$ of the sender's key pair $(sk_S, pk_S)$, and the receiver identifier includes the verification key $pk_R$ of the receiver's key pair $(sk_R, pk_R)$. The signature computed as $\sigma_2=\text{sig}(sk_S, pk_S\|pk_R\|\text{boxID})$. In step 15, the second signature σ2 and message $m_2$ are provided on the box in machine-readable printed form as described above, e.g. via a printed label.

The sender may load a consignment of N boxes, prepared as described above, into a delivery vehicle having a vehicle identifier, here the license plate LP of a delivery truck, for transport to the receiver. In step 16, the sender sends an advance communication, e.g. via email, to the receiver indicating the delivery vehicle identifier LP and the container identifiers $\text{boxID}_1, \ldots, \text{boxID}_N$ for all boxes. In step 17, the truck is dispatched to send the consignment of boxes to the receiver.

Figure 5:
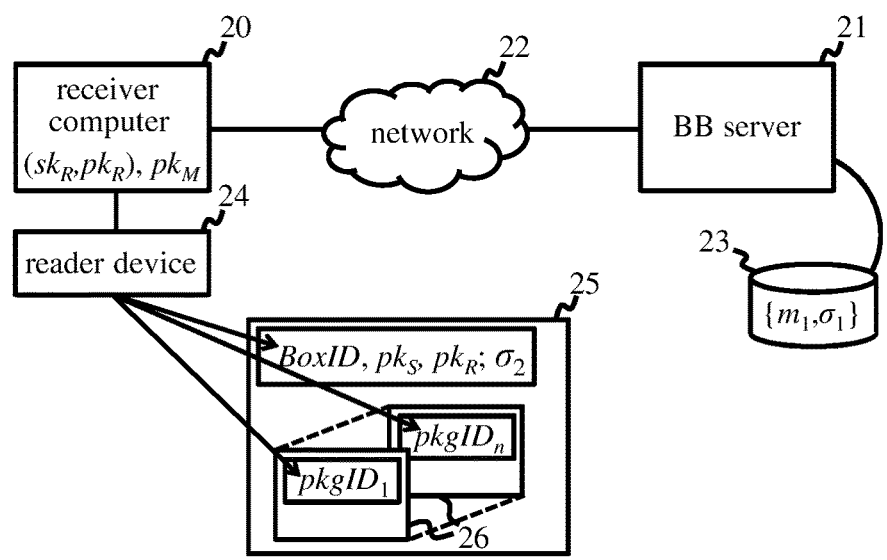
FIG. 5 is a schematic representation of a verification system used by receivers in embodiments of the invention.

FIG. 5 is schematic block diagram of a verification system for use by receivers in this embodiment. The system includes a receiver computer 20 which is operable for communication with BB server 21 via a network 22. Receiver computer 20 stores the receiver key pair $(sk_R, pk_R)$ and the manufacturer verification key $pk_M$. BB server 21 stores a set of records $\{(m_1, \sigma_1)\}$ received from senders as described above. The record set $\{(m_1, \sigma_1)\}$ is held in storage, represented here by database 23, operatively associated with BB server 21, whereby the stored records can be accessed by receivers via a bulletin board run by the BB server in generally known manner. A reader device 24 is operatively associated with receiver computer 20. Reader device 24 is adapted for reading the data $(m_2, \sigma_2)$ applied to a box 25 by the sender as described above, along with the identifiers $\text{pkgID}_1, \ldots, \text{pkgID}_n$ of all packages 26 in the box.

Receiver computer 20 may be implemented, for example, by a general-purpose user computer such as a desktop computer, laptop computer, tablet, notebook, palmtop, mobile phone, PDA (personal digital assistant), or other user computer device, or may be implemented by a special-purpose computer such as a dedicated hand-held unit. Reader device 22 may be integrated with the receiver computer (e.g. an integrated camera of a mobile phone or tablet computer) or may be coupled to receiver computer 24 (via a wired or wireless link) in any convenient manner. Various implementations of reader device 24 can be envisaged according to the particular manner in which information is represented on the box and packages. For example, reader device 24 may include one (or a combination of) a camera, scanner, magnetic strip reader, tag reader, or other sensor adapted to capture an image, scan, sense or otherwise "read" the printed information so that the necessary data is provided to receiver computer 20. The reader device 24 and/or receiver computer 20 may include functionality for interpreting the read data, e.g. images captured by a camera, to extract the signature and other data according to the particular manner of presentation.

In general, network 22 may include one or more component networks and/or internetworks, including the Internet, and each of receiver computer 20 and BB server 21 may be implemented by a general- or special-purpose computer including one or more (real or virtual) machines providing functionality for implementing the operations described. Particular functionality of these computers may be provided by logic implemented in hardware or software or a combination thereof. The logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 6:
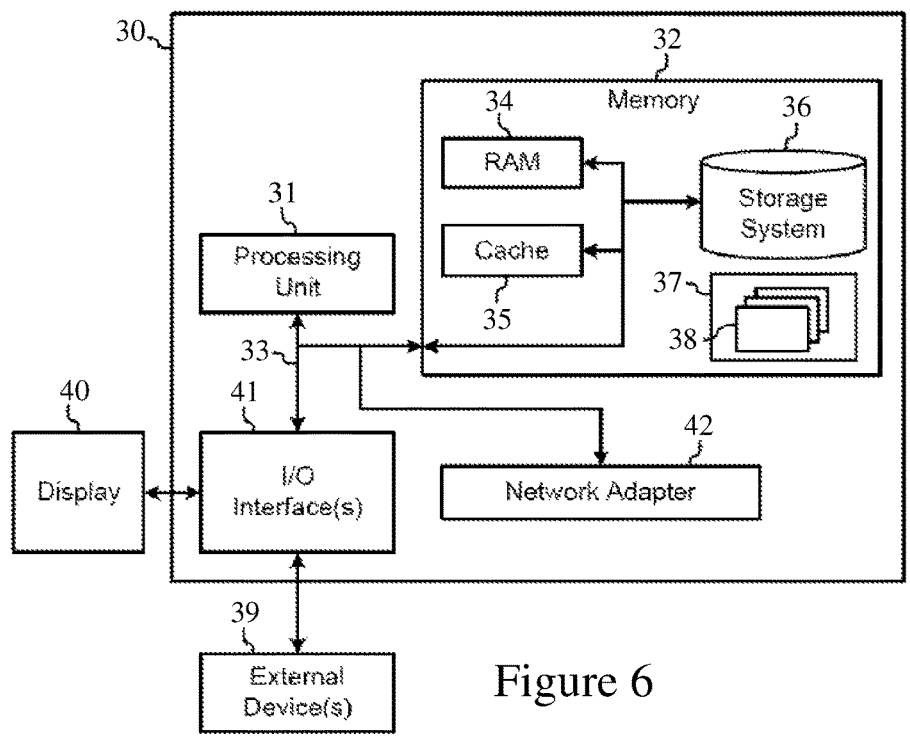
FIG. 6 is a generalized schematic of a computer in the FIG. 5 system.

FIG. 6 is a block diagram of exemplary computing apparatus for implementing a computer of the above system. The computing apparatus is shown in the form of a general-purpose computer 30. The components of computer 30 may include processing apparatus such as one or more processors represented by processing unit 31, a system memory 32, and a bus 33 that couples various system components including system memory 32 to processing unit 31.

Bus 33 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 30 typically includes a variety of computer readable media. Such media may be any available media that is accessible by computer 30 including volatile and non-volatile media, and removable and non-removable media. For example, system memory 32 can include computer readable media in the form of volatile memory, such as random access memory (RAM) 24 and/or cache memory 35. Computer 30 may further include other removable/non-removable, volatile/non-volatile computer system storage media. By way of example only, storage system 36 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 33 by one or more data media interfaces.

Memory 32 may include at least one program product having one or more program modules that are configured to carry out functions of embodiments of the invention. By way of example, program/utility 37, having a set (at least one) of program modules 38, may be stored in memory 32, as well as an operating system, one or more application programs, other program modules, and program data. Each of the operating system, one or more application programs, other program modules, and program data, or some combination thereof, may include an implementation of a networking environment. Program modules 38 generally carry out the functions and/or methodologies of embodiments of the invention as described herein.

Computer 30 may also communicate with: one or more external devices 39 such as a keyboard, a pointing device, a display 40, etc.; one or more devices that enable a user to interact with computer 30; and/or any devices (e.g., network card, modem, etc.) that enable computer 30 to communicate with one or more other computing devices. Such communication can occur via Input/Output (I/O) interfaces 41. Also, computer 30 can communicate with one or more networks such as a local area network (LAN), a general wide area network (WAN), and/or a public network (e.g., the Internet) via network adapter 42. As depicted, network adapter 42 communicates with the other components of computer 30 via bus 33. It should be understood that although not shown, other hardware and/or software components could be used in conjunction with computer 30. Examples include, but are not limited to: microcode, device drivers, redundant processing units, external disk drive arrays, RAID systems, tape drives, and data archival storage systems, etc.

Figure 7:
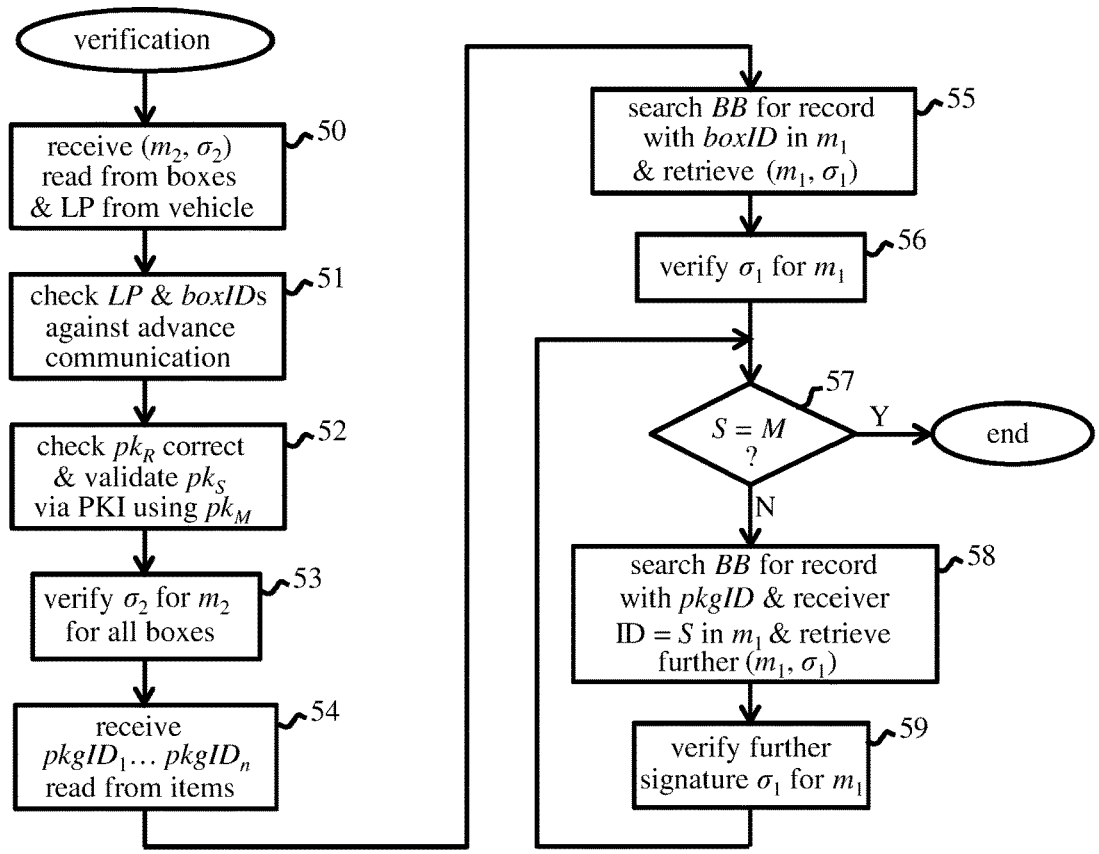
FIG. 7 indicates steps of a verification method performed by a receiver computer in the FIG. 5 system.

In the verification process of this embodiment, the receiver receives the advance communication sent by the sender in step 16 of FIG. 4, and awaits the delivery truck. On arrival, the receiver reads the license plate LP, e.g. using reader device 24, and uses the reader device to read $(m_2, \sigma_2)$ from each box. FIG. 7 shows the steps performed by receiver computer 20. The data LP and $(m_2, \sigma_2)$ for each box are received by receiver computer 20 in step 50. In step 51, the receiver computer checks that LP matches the vehicle identifier in the advance communication, and that $boxID_1, \ldots, boxID_N$ in the communication match the box identifiers in messages $m_2$ read from the boxes. This confirms all expected boxes were delivered in the correct vehicle. In step 52, the receiver computer checks that the receiver identifier in messages $m_2$ from all boxes corresponds to the verification key $pk_R$ of the receiver key pair $(sk_R, pk_R)$. The receiver computer also checks that the sender identifier in all messages $m_2$ is the same, and verifies via the PKI that this identifier is a valid verification key $pk_S$ of the sender. The root certificate certifying this public key is verified using the manufacturer verification key $pk_M$. In step 53, the receiver computer then verifies the signature $\sigma_2$ on each box for the corresponding message $m_2$ containing the sender and receiver identifiers and the box identifier boxID for that box. As an additional security check here, the receiver computer may store the unique boxID for received boxes (or the unique tuple boxID, S as appropriate) and check that this data for each box has not been previously stored due to duplication of data from other containers. Steps 52 and 53 thus confirm that the receiver is the intended recipient of all boxes, and that the sender was the true certified distribution entity in the supply chain.

If the above verification steps are successful, the receiver can open a box and read the package identifiers $pkgID_1, \ldots, pkgID_n$ of the packages inside. The remaining steps of FIG. 7 are performed for each box $boxID_1, \ldots, boxID_N$ to ensure that all packages in that box individually passed through a valid supply chain. The package identifiers $pkgID_1, \ldots, pkgID_n$ are received by receiver computer 20 in step 54. In step 55, the receiver computer accesses BB server 21 via network 22 and searches the bulletin board for a record $(m_1, \sigma_1)$ with the box identifier boxID in $m_1$. (If the box identifiers are unique only to the sender, then the search may be performed here for a tuple of boxID and sender name S as confirmed by the certificate on $pk_S$ validated in step 52.). The signature $\sigma_1$ in the retrieved record $(m_1, \sigma_1)$ is then verified in step 56. In particular, the package identifiers $pkgID_1, \ldots, pkgID_n$ received in step 54 are checked against the package identifiers in $m_1$, and $\sigma_1$ is verified for $m_1$ using the sender's verification key $pk_S$ validated in step 52.

The subsequent steps in FIG. 7 are performed for each package $pkgID_1, \ldots, pkgID_n$ in the box. In decision step 57, receiver computer determines if the sender identity S in the record retrieved in step 55 is the original sender (i.e. the first sender in the supply chain) for that package, in this case the manufacturer identified in the certificate on $pk_M$. If so, (decision "Yes" (Y) at step 57) then authentication is complete for that package. If not ("No" (N) at decision step 57) then operation proceeds to step 58. Here, the receiver computer searches the bulletin board for a further record $(m_1, \sigma_1)$ with a message $m_1$ containing package identifier pkgID and a receiver identifier corresponding to the sender identifier S. In this way, the receiver computer obtains a first signature produced by the previous sender in the supply chain for the package. In step 59, the receiver computer verifies the further signature $\sigma_1$ for the message $m_1$ stored therewith using the verification key $pk_S$ of the previous sender identified in the further record. The verification keys of all certified distribution entities are public and may be distributed to all parties in the system. Alternatively, the verification key $pk_S$ of the previous sender may be obtained from the certification authority using the previous sender identity from the record, and validity of this key $pk_S$ can be verified using the manufacturer key $pk_M$ as before). Operation then reverts to step 57, whereby steps 57 to 59 are repeated for each previous sender in the supply chain for the current package until the previous sender is determined to be the original sender, here manufacturer, in step 57. Steps 57 to 59 are then performed for each further package. If authentication fails for any package at any stage in the authentication process back to the manufacturer, then the package will be rejected by the receiver. Assuming provenance of all received packages is successfully authenticated, then the receiver is free to select packages for packing in new boxes, along with other authenticated packages from boxes received from other senders if desired, and the entire authentication process can be repeated for the next step in the distribution chain.

The above process allows any receiver to authenticate the supply chain for each individual item back to the primary sender of that item, even if items are repacked in new containers at various stages of the distribution process. This process can be performed by receivers at successive steps along the supply chain. Different receivers can unpack containers and repack items in new containers after verifying authenticity of individual items back through previous steps in the supply chain for each item. Provenance of individual items can thus be verified using the container-level signatures, and aggregation/disaggregation of items due to repacking is accommodated, in a secure, practical and efficient authentication system. The signature $\sigma_2$ on each box allows a recipient to verify that boxes came from certified distributors, and were indeed intended to be delivered to them. The advance communication sent to a recipient prevents products stolen from a sender being later sold to the intended recipient, since it contains the identifier LP of the delivery vehicle. All parties can ensure that received products passed through a valid supply chain of certified distributors. Recipients can thus be assured that they are not unwittingly accepting stolen goods, and origin and authenticity of items can be verified along the full extent of a pharmaceutical supply chain.

Figure 8:
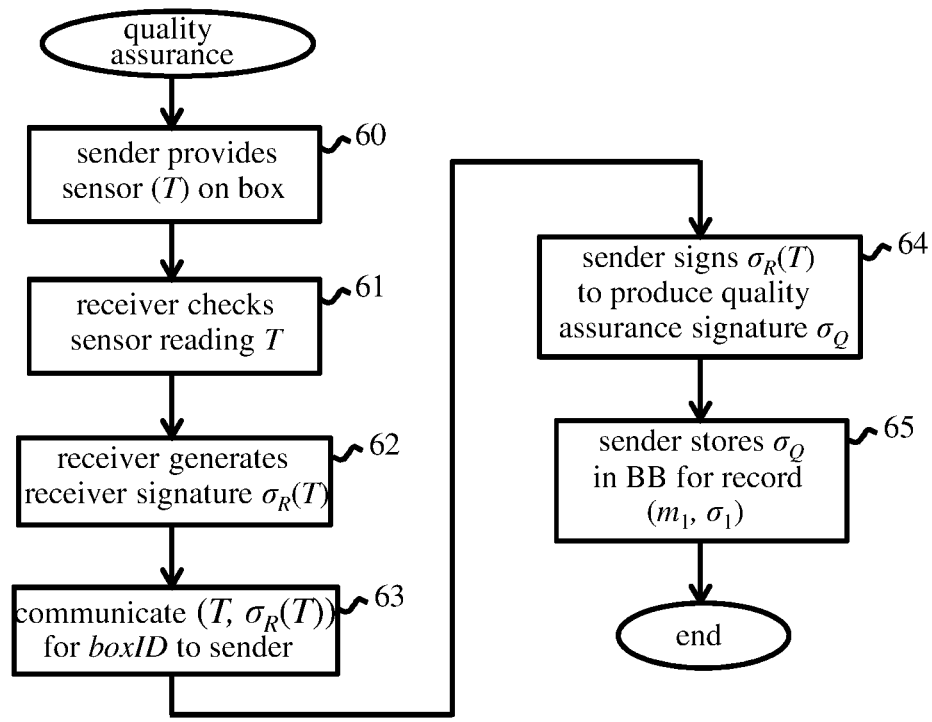
FIG. 8 indicates additional steps performed for quality assurance in the authentication/verification process according to embodiments of the invention.

An additional procedure may be employed to ensure that items are properly handled in the supply chain and assure receivers as to quality of received items. Such a procedure may be used, for example, to check temperature, humidity, vibration, shock, etc., conditions to which items are exposed during transport. A sensor can be provided on each container of items to be sent to a receiver, the sensor being adapted to record a value indicative of a transport condition experienced by the container. FIG. 8 indicates steps of the quality assurance procedure performed by the sender and receiver, in this case for monitoring temperature (T). In step 60, a temperature sensor is provided on a box, authenticated as in FIG. 4, to be sent to the receiver. The sensor here includes an irreversible thermometer, such that after the sensor have been exposed to certain temperature extreme, e.g. a highest temperature reading, the reading cannot be changed. On receipt of the box, the receiver checks the value (T) recorded by the sensor in step 61. In step 62, the receiver generates a receiver digital signature $\sigma_R$ by signing the recorded value T using the secret signing key $sk_R$ of his key pair ($sk_R$, $pk_R$), i.e. $\sigma_R=\text{sig}(sk_R, T)$. In step 63, the receiver sends a communication to the sender S, e.g. via email, containing (T, $\sigma_R$) for the box boxID. On receipt in step 64, the sender generates a further digital signature $\sigma_Q$ by using his secret signing key $sk_s$ to sign the receiver digital signature $\sigma_R$ and a receiver identifier for the receiver, here $pk_R$, i.e. $\sigma_Q=\text{sig}(sk_S, \text{sig}(sk_R, T)||pk_R)$. In step 65, the sender then sends the signature $\sigma_Q$ for storage at BB server 21 with the first signature $\sigma_1$ for the box, e.g. by sending boxID, S, $\sigma_Q$ to server 21. Any party with access to the bulletin board can then check that the box was correctly transported under correct temperature conditions by verifying $\sigma_Q$ using $pk_S$ and the receiver's verification key $pk_R$. The temperature reading is double-signed, i.e. by both sender and receiver, to prevent either party falsifying the temperature reading. This procedure also makes it possible to track any distributor who did not ensure appropriate transport of items.

Figure 9:
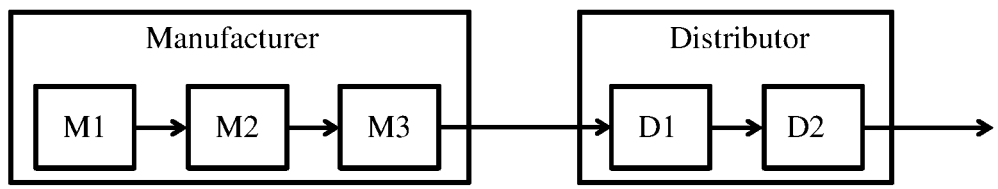
FIG. 9 shows a portion of a supply chain involving intermediate entities.

In some embodiments, a sender may send containers to the receiver via one or more intermediate entities who do not need to unpack boxes. A modification to the earlier embodiment allows addition of a further level of granularity to securely accommodate transport via such entities. FIG. 9 shows an illustrative example. Here, a manufacturer company includes subsidiaries M1, M2 and M3, and a distributor company includes subsidiaries D1 and D2. The original supplier of items is assumed to be M1, and the intended receiver is D1. M1 packs the items in boxes and sends the boxes to M2 for forwarding on, without repacking, via M3 to D1. M1 performs the authentication method of FIG. 4 for receiver D1 with the exception that the second signature $\sigma_2$ is produced using a different signing-verification key pair ($sk_1$, $pk_1$) of the signature scheme. The second signature $\sigma_2$ is produced using $sk_1$ by signing the container identifier boxID and, in this example, also a sender identifier (here $pk_1$) for sender M1, and an entity identifier including the verification key $pk_1$ of a signing-verification key pair ($sk_1$, $pk_1$) of the signature scheme for the next intermediate entity in the supply chain, here M2.

In more detail, for the example shown, each subsidiary M1, M2 and M3 of the manufacturer holds a respective key pair ($sk_1^M$, $pk_1^M$), ($sk_2^M$, $pk_2^M$) and ($sk_3^M$, $pk_3^M$) of the signature scheme. Each verification key $pk_1^M$, $pk_2^M$ and $pk_3^M$ is certified by a registration office of the manufacturer. This means that the registration office signs the verification key of each subsidiary and produces individual certificates. The registration office of the manufacturer also has a key pair ($sk^M$, $pk^M$) for this purpose. Similarly, each subsidiary D1 and D2 of the distributor holds a respective key pair ($sk_1^D$, $pk_1^D$) and ($sk_2^D$, $pk_2^D$), the verification keys of which are certified by a registration office of the distributor holding a key pair ($sk^D$, $pk^D$). The verification keys of all possible distributors of a participant are known to this specific participant. In the present example, this means that Distributor D1 knows $pk^M$.

When M1 performs step 14 of FIG. 4, the resulting signature is computed as $\sigma_2^{M1}=\text{sig}(sk_1^M, pk_1^M||pk_2^M||\text{boxID})$. The verification key $pk_1^M$ has a certificate signed by the registration office of the manufacturer, using key $sk_M$. The signature $\sigma_2^{M1}$ and signed message containing boxID are printed on the box, and the box is sent to M2.

On receipt of the box, M2 verifies the authenticity of $\sigma_2^{M1}$ using M1's verification key $pk_1^M$. M2 can verify that $pk_1^M$ is valid using $pk^M$ to validate the certificate signed by the registration office of the manufacturer. M2 also verifies that it is the intended recipient by checking $pk_2^M$. M2 then prints a new signature $\sigma_2^{M2}=\text{sig}(sk_2^M, pk_2^M||pk_3^M||\text{boxID})$ on the box, and sends the box to M3. M3 verifies both signatures $\sigma_2^{M1}$ and $\sigma_2^{M2}$ in a similar manner to M2. M3 then prints a new signature $\sigma_2^{M3}=\text{sig}(sk_3^M, pk_3^M||pk_1^D||\text{boxID})$ on the box, and sends it to D1.

D1 verifies all second signatures $\sigma_2^{M1}$, $\sigma_2^{M2}$ and $\sigma_2^{M3}$ and checks that $pk_1^M$, $pk_2^M$ and $pk_3^M$ are valid using the known verification key $pk^M$ of the manufacturer. D1, who is the intended receiver of the container originally packed by M1, thus verifies the second signature $\sigma_2^{M1}$ produced by sender M1 using its signing key $pk_1^M$, and also each further signature $\sigma_2^{Mi}$, $i \in \{2, 3\}$ produced by each intermediate entity Mi using its corresponding secret signing key $sk_i^M$. D1 also verifies via the PKI that $pk_1^M$, and $pk_i^M$ are valid verification keys. D1 performs all other verification steps for the received box and verifies the first signature $\sigma_1$ produced by sender M1 using $sk_S$ as before. This procedure ensures that not only the sender M1 but also all intermediate forwarding entities are valid certified distributors, while simplifying the procedure at the forwarding entities. D1 can then start the repacking of boxes, and the procedure continues as before.

Figure 10:
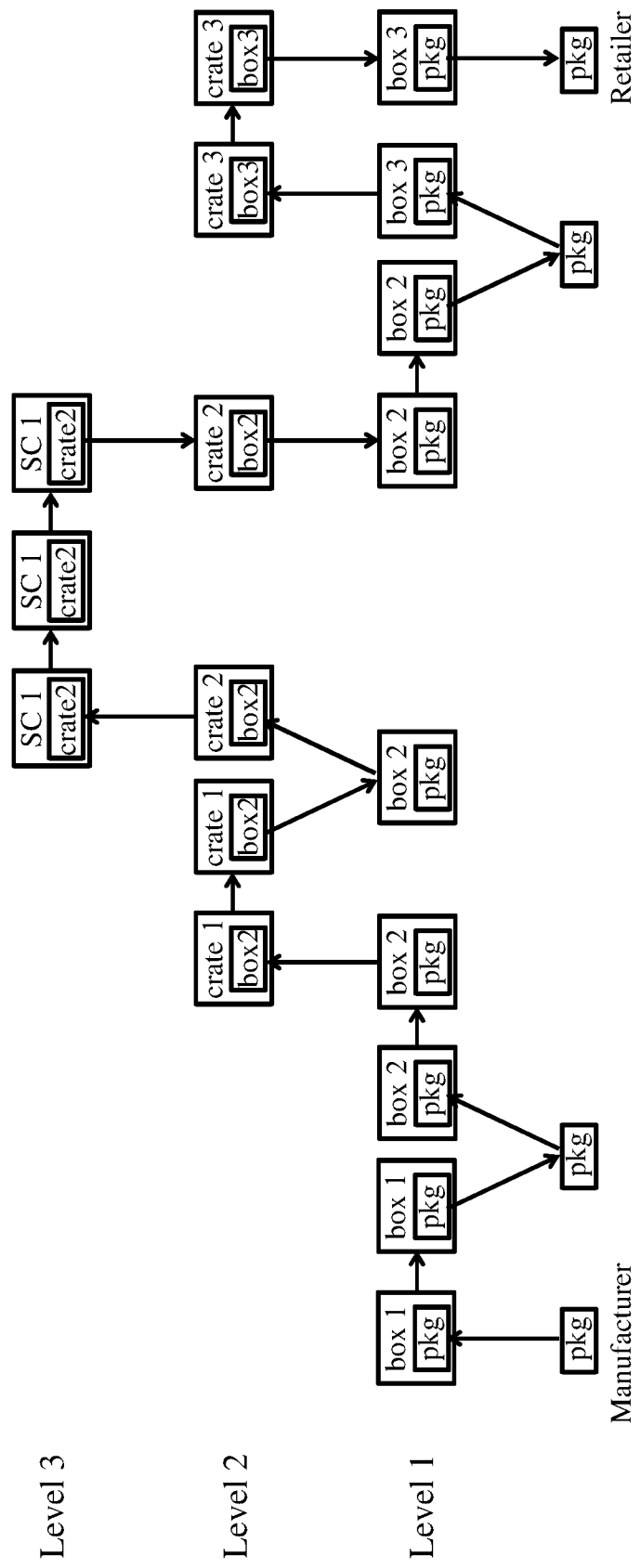
FIG. 10 illustrates different packing levels in a supply chain.

The above techniques can also be employed at different packing levels of a supply chain as illustrated schematically in FIG. 10. This example shows a supply chain with three packing levels via which a package (pkg) is transported between an original sender (here a manufacturer) and a final recipient (here a retailer). Transportation steps between particular senders and receivers in the supply chain are indicated by horizontal arrows. Upwardly directed arrows indicate packing of items in containers. Downwardly directed arrows indicate unpacking of items. In the lowest packing level, Level 1, items correspond to packages and the containers are boxes. Packages are thus packed in boxes in this level, and may be unpacked and repacked in new boxes by receivers as indicated. In Level 2, items correspond to boxes and the containers are crates. Boxes are thus packed and transported in crates in this level, and boxes may be unpacked and repacked in new crates as illustrated. In the uppermost level, Level 3, the items correspond to crates which are packed in shipping containers (SC) for transportation. In general, of course, a supply chain may include any number of packing levels, and items may be unpacked/repacked any number of times, or not at all in a given level. The above techniques can be used to authenticate items at every packing level, with each recipient of items (packages, boxes, crates, etc.) verifying authenticity of the items back through their successive transportation and packing/unpacking steps. The authentication process thus allows items to be authenticated through all steps of packing/unpacking/transportation between an original sender and a final recipient in a supply chain. The manufacturer may also provide a digital signature on each individual package, e.g. by signing the package identifier using a secret manufacture signing key.

This signature can also be verified, using the manufacturer's public verification key, by recipients of packages up to and including the final recipient.

Many other changes and modifications can be made to the exemplary embodiments described. For example, the first signatures may be made accessible to receivers via other mechanisms than a bulletin board. The network storage may be distributed storage, for instance, with the data $(m_1, \sigma_1)$ made accessible via websites of distribution entities. While network storage is utilized for convenience, embodiments might be envisaged in which $(m_1, \sigma_1)$ is provided on containers. All signatures $(m_1, \sigma_1)$ relevant to a given item would then need to be copied to the new container for that item on repacking.

Signed messages may include additional elements if desired, and various further features may be employed for additional security and/or convenience as deemed appropriate to a particular distribution system. For example, additional security labels such as tamper-proof stickers may be provided on items to provide authenticity assurances for consumers.

The authentication schemes described can be applied to numerous items other than pharmaceutical products, e.g. engineering components, automotive parts, or items in any other industry prone to counterfeiting.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for authenticating a container of items to be sent by a sender to a receiver in a supply chain, wherein a plurality of items have been packed in the container, wherein each of the plurality of items includes a respective item identifier, wherein a container identifier is provided on the container, and wherein the container comprises at least one of a physical box, physical case, physical wrapper, physical package, physical crate, or shipping container and the item identifiers are applied to physical items at the manufacturer and printed on the items, the method comprising:

generating, at a computing device associated with the sender, a first digital signature by signing a message, comprising said container identifier and each said item identifier, using a secret signing key skS of a signing-verification key pair (skS, pkS) of a digital signature scheme;

providing said first digital signature for access by the receive, wherein the sender stores the message with the first digital signature in network storage for later access by the receiver via a network; and generating a second signature similar to the first signature, wherein the second signature is provided in machine-readable printed form on the container; and sending the container into a vehicle for delivery associated with a vehicle identifier to the receiver for authenticating items from the sender and sends an electronic email including the vehicle identifier to the receiver indicating delivery of items.

2. A method as claimed in claim 1 wherein said message includes a sender identifier and a receiver identifier for said sender and receiver respectively.

3. A method as claimed in claim 2 including providing the message with the first digital signature for access by the receiver.

4. A method as claimed in claim 1 including:

generating the second digital signature by signing the container identifier, a sender identifier for said sender and a receiver identifier for said receiver using said secret signing key skS;

and providing the second digital signature on the container.

5. A method as claimed in claim 4 wherein the sender identifier comprises the verification key $pk_S$ of said key pair $(sk_S, pk_S)$, and the receiver identifier comprises a verification key $pk_R$ of a signing-verification key pair $(sk_R, pk_R)$ of said digital signature scheme where $sk_R$ is a secret signing key of the receiver.

6. A method as claimed in claim 1 including sending the container to said receiver by sending the container to an intermediate entity for forwarding to the receiver, the method including:

generating a second digital signature by signing the container identifier, a sender identifier for said sender and an entity identifier for said intermediate entity using a secret signing key sk1 of a signing-verification key pair (sk1, pk1) of said digital signature scheme, wherein said sender identifier comprises the verification key pk1 of said key pair (sk1, pk1), and said entity identifier comprises a verification key pki of a signing-verification key pair (ski, pki) of said digital signature scheme, where ski is a secret signing key of the intermediate entity; and providing the second digital signature on the container.

7. A method as claimed in claim 1 including:

providing a sensor on the container, the sensor being adapted to record a value indicative of a transport condition experienced by the container during transport to the receiver;

in response to subsequent communication from the receiver of a receiver digital signature produced by the receiver by signing said value recorded by the sensor using a secret signing key skR of a signing-verification key pair (skR, pkR) of said digital signature scheme, generating a further digital signature by signing said receiver digital signature and a receiver identifier for the receiver using said secret signing key sks; and storing the further digital signature with the first digital signature in said network storage.

8. A method as claimed in claim 1 wherein said message includes a sender identifier and a receiver identifier for said sender and receiver respectively, the method including:

generating a second digital signature by signing, using said secret signing key skS, the container identifier, the verification key pkS of said key pair (skS, pkS), and a verification key pkR of a signing-verification key pair (skR, pkR) of said digital signature scheme where skR is a secret signing key of the receiver;

storing said message with the first digital signature in network storage for access by the receiver; and providing the second digital signature on the container.

9. A method as claimed in claim 1 including sending a communication to the receiver indicating the container identifier and the vehicle identifier for a delivery the vehicle, wherein the container is sent to the receiver in said delivery vehicle.

10. A method as claimed in claim 1 wherein the container identifier is provided in print on the container.

11. A verification method for verifying authenticity of items in a container of items authenticated by a method as claimed in claim 1 and received from the sender by the receiver, the verification method comprising:
   accessing said first digital signature; and
   verifying the first digital signature for the container identifier and the item identifier for each item in the container using the verification key pkS of said key pair (skS, pkS).

12. A verification method as claimed in claim 11 wherein the container is authenticated by an authentication method in which said message includes a sender identifier and a receiver identifier for said sender and receiver respectively and the message is stored with the first digital signature in network storage for access by the receiver, and wherein said sender is the last sender in a supply chain for each item comprising senders who authenticate their containers of items by said authentication method, the verification method including, for each item:
   (a) determining if the sender, having a said sender identifier S, is an original sender in the supply chain for that item, and if not
   (b) finding in said network storage a further first digital signature produced, by a previous sender in said supply chain for the item, on a message containing the item identifier for that item and a receiver identifier corresponding to said sender identifier S;
   (c) verifying said further first digital signature for the message stored therewith; and
   (d) repeating steps (a) to (c) for each previous sender in the supply chain until the previous sender is determined to be the original sender in step (a).

13. A verification method as claimed in claim 11 wherein a second digital signature, produced by the sender by signing the container identifier, a sender identifier for the sender and a receiver identifier for the receiver using said secret signing key $sk_S$, is provided on the container, the verification method including:
   verifying the second digital signature for the container identifier, the sender identifier and the receiver identifier.

14. A verification method as claimed in claim 13 wherein the sender and receiver identifiers are provided on the container, the sender identifier comprises the verification key $pk_S$ of said key pair ($sk_S$, $pk_S$), and the receiver identifier comprises a verification key $pk_R$ of a signing-verification key pair ($sk_R$, $pk_R$) of said digital signature scheme where $sk_R$ is a secret signing key of the receiver, the verification method including:
   checking that the receiver identifier comprises the verification key pkR of said signing-verification key pair (skR, pkR); and
   verifying via a public key infrastructure that pkS is a valid verification key of the sender.

15. A verification method as claimed in claim 11 wherein:
   the container is received from the sender by forwarding via at least one intermediate entity having a corresponding secret signing key ski of a signing-verification key pair (ski, pki) of said digital signature scheme;
   a second digital signature, produced by the sender by signing the container identifier using a secret signing key sk1 of a signing-verification key pair (sk1, pk1) of said digital signature scheme, is provided on the container;
   a further digital signature, produced by each intermediate entity by signing the container identifier using its corresponding secret signing key ski, is provided on the container;
   and wherein the verification method includes: verifying the second digital signature using the verification key pk1 of said signing-verification key pair (sk1, pk1); verifying said further digital signature of each intermediate entity using the verification key pki of the corresponding signing-verification key pair (ski, pki), and verifying via a public key infrastructure that the verification keys pk1 and pki are valid verification keys.

16. A verification method as claimed in claim 11 wherein a sensor is provided on the container, the sensor being adapted to record a value indicative of a transport condition experienced by the container during transport to the receiver, the verification method including:
   generating a receiver digital signature by signing said value recorded by the sensor using a secret signing key skR of a signing-verification key pair (skR, pkR) of said digital signature scheme; and
   communicating the receiver digital signature to the sender.

17. A verification method as claimed in claim 11 including:
   receiving a communication from the sender indicating the container identifier and a vehicle identifier for a delivery vehicle in which the container is sent to the receiver; and
   checking that the vehicle identifier in said communication matches that of the delivery vehicle delivering the container to the receiver.

18. A computer program product comprising a non-transitory computer readable storage medium having program instructions embodied therein, the program instructions being executable by a receiver computer to cause the receiver computer to perform a verification method for verifying authenticity of items in a container of items authenticated by a method as claimed in claim 1 and received from the sender, said verification method comprising:
   receiving the container identifier on the container and the item identifier for each item in the container;
   receiving said first digital signature; and
   verifying the first digital signature for the container identifier and the item identifier for each item in the container using the verification key pkS of said key pair (skS, pkS).

19. The computer program product as claimed in claim 18 wherein the container is authenticated by an authentication method in which said message includes a sender identifier and a receiver identifier for said sender and receiver respectively and the message is stored with the first digital signature in network storage, and wherein said sender is the last sender in a supply chain for each item comprising senders who authenticate their containers of items by said authentication method, said verification method including accessing said network storage to obtain the first digital signature and, for each item:
   (a) determining if the sender, having a said sender identifier S, is an original sender in the supply chain for that item, and if not
   (b) finding in said network storage a further first digital signature produced, by a previous sender in said supply chain for the item, on a message containing the item identifier for that item and a receiver identifier corresponding to said sender identifier S;

(c) verifying said further first digital signature for the message stored therewith; and
(d) repeating steps (a) to (c) for each previous sender in the supply chain until the previous sender is determined to be the original sender in step (a).

\* \* \* \* \*